United States Patent Office

Re. 26,760
Reissued Jan. 6, 1970

26,760

TREATMENT OF NEWLY FORMED GLASS ARTICLES

William P. Mahoney, Muncie, Ind., assignor to Ball Brothers Company Incorporated, Muncie, Ind., a corporation of Indiana No Drawing. Original No. 3,249, 246, dated May 3, 1966, Ser. No. 402,334, Oct. 7, 1964. Application for reissue Apr. 17, 1968, Ser. No. 741,819
Int. Cl. B65d *23/08, 23/02*
U.S. Cl. 215—1 26 Claims

Matter enclosed in heavy brackets [ ] appears in the original patent but forms no part of this reissue specification; matter printed in italics indicates the additions made by reissue.

*ABSTRACT OF THE DISCLOSURE*

*A method for producing a glass article of improved chemical durability and bursting strength which includes the steps of treating a newly formed glass article as delivered from a forming machine, with a decomposable halogen-containing compound while the article is at a temperature above the decomposition point of the halogen-containing compound due to the residual heat of formation retained by the article whereby the chemical durability and bursting strength of the article are improved while retaining substantially the original appearance of the article.*

This invention relates to a novel method of treating newly formed glass articles to produce a substantial improvement in the strength and durability of the resulting articles and more particularly, relates to a method which produces substantial improvement in the chemical durability and bursting strength of glass articles. The invention also relates to the novel glass articles produced by employing the method of the invention.

Strength and chemical durability improvements in glass articles are highly desirable since they permit the use of thinner-walled articles which reduces the cost thereof. Glassware has been treated with sulfur compounds to improve the chemical durability or inertness of the ware. However, the sulfur treatment is not completely successful due to the toxicity and operational hazards encountered. Also, high strength glassware having good chemical durability has been produced by changing the glass composition itself, but such changes are not considered practical for short production runs due to the large capacity of the glass furnaces used.

In view of the lack of success heretofore in producing high strength glassware of improved chemical durability by the expedient of chemical treatment, it was completely unexpected and surprising to discover that by employing the method of the present invention, glassware of improved strength and chemical durability may be produced conveniently and simply. Also, since the method of the invention is performed on newly formed ware as it passes from the forming machine to an annealing lehr, it is not necessary to change the normal sequence of processing. Furthermore, the physical appearance of the improved strength glassware produced in accordance with the method of the present invention is not permanently changed, and the chemical durability or inertness is substantially improved. Thus, the method of the invention not only achieves the objective of improved strength ware by chemical treatment which heretofore was unattainable, but also the method of the invention retains the desired flexibility of normal glass forming operations.

In accordance with the present invention, glassware of improved strength, particularly bursting strength and improved chemical durability, is produced by treating a newly formed glass article as delivered from a forming machine, with a decomposable halogen-containing compound while the glass article is at a temperature above the decomposition point of the halogen-containing compound due to the residual heat of formation retained by the article. The resulting glass articles, after washing to remove a temporary cloudy film, have a physical appearance substantially the same as the original articles, that is, the appearance of the articles is not significantly changed or altered by the method of the invention.

Advantageously, the chemical treatment of the invention is performed on newly formed glassware as it is transferred from the forming machine to the lehr. At this stage, the glassware retains sufficient heat of formation to maintain the temperature thereof above about 800° F. The maximum treatment temperature is not critical and will vary depending, to a large extent, upon the particular glass composition and the ware-forming temperatures. Advantageously, the temperature of the glass during treatment will be between about 800° F. and 1400° F. and preferably between about 800° F. and 1200° F.

The conditions under which the halogen-containing compound is employed in the treatment of the glassware, to a large extent, will depend upon the form of the compound. For example, if the compound is a fluid such as a gas or a liquid, it may be sprayed onto the exterior of the ware or may be introduced into the interior of the ware simply by forcing the fluid through a tube inserted into the ware. On the other hand, if the compound is in solid form, it may be applied as a powder or may be mixed with a suitable diluent or solvent such as water and sprayed onto or into the ware.

The decomposable halogen-containing compound employed in the method of the invention as set forth above decomposes at a temperature below the temperature of the newly formed ware and preferably below about 800° F. Examples of suitable materials include organic compounds such as the polyhalogen-substituted organic compounds, e.g., chlorofluorohydrocarbons such as dichlorodifluoromethane, trichloro-monofluoromethane, trichlorotrifluoroethane, dichloro-tetrafluoroethane, etc., inorganic compounds, e.g., halide salts such as ammonium chloride and fluoride, boron trifluoride, etc., and similar halogen-containing compounds. In place of the halide salts, the corresponding acids such as hydrofluoric acid may be employed.

After the glassware has been treated with the halogen-containing compound in accordance with the method of the invention, the treated ware may be passed through a lehr and processed in the conventional manner. Thus, the method of the invention is applicable to glass articles made from different types of glass compositions and to glassware processed according to various forming and annealing processes, provided that the newly formed glassware may be subjected to treatment with a halogen-containing compound while the glass is at a temperature above the decomposition point of the compound due to the residual heat of formation retained by the ware.

The following examples illustrate benefits and advantages to be derived by employing the method of the invention in the making of glass articles. As will be seen hereafter, the articles produced by the employment of the method of the invention, have substantially improved chemical durability and increased bursting strength as compared with articles made by conventional processes.

EXAMPLE I

Twelve-ounce beer bottles of the nonreturnable type formed on a Hartford-Empire I.S. machine were treated in the following manner. Approximately 0.1 milliliter of trichloromonofluoromethane was delivered into each of 24 bottles formed in the same mold cavity by thrusting a high silica glass delivery tube into the mouth of each bottle as the bottle was at rest after being released by the takeout tongs of the machine and prior to the transfer of the bottle to the machine conveyor. The glass delivery tube was connected to a supply tank by means of plastic tubing. About one-half second was allowed for delivery of the trichloro-monofluoromethane into the bottle. The treated bottles were then transferred onto the machine conveyor, next onto a lehr conveyor, passed through a conventional lehr and collected for testing as they issued from the lehr. The bottles during treatment were as a temperature in the range of about 800° F. to 1000° F.

An equal number of untreated bottles formed in the same mold cavity were collected prior to the treating of the 24 bottles. The untreated bottles served as a control to provide a comparison with the treated samples. The samples first were washed with water and visually inspected, and no significant difference in appearance was observed between the treated samples and the untreated samples.

The bottles then were tested on a Preston Increment Pressure Tester manufactured by the American Glass Research Company of Butler, Pennsylvania. The starting pressure was 100 p.s.i. and the pressure was increased at three second intervals until each bottle burst. The pressure at rupture was recorded as the bursting pressure.

The following table gives the results of the above tests showing the number of bottles which broke at particular bursting pressures:

| Bursting pressure (p.s.i.) | Control samples | | Treated samples | |
|---|---|---|---|---|
| | Number of samples broken | Accumulated percent breakage | Number of samples broken | Accumulated percent breakage |
| 137 | 2 | 8 | 1 | 4 |
| 150 | 2 | 17 | | |
| 162 | 2 | 25 | | |
| 175 | 2 | 33 | 1 | 8 |
| 187 | 6 | 58 | 2 | 17 |
| 200 | 2 | 67 | 4 | 33 |
| 225 | 4 | 83 | 5 | 54 |
| 250 | 3 | 96 | 5 | 75 |
| 275 | 1 | | 3 | 87 |
| 300 | | | 3 | |

The median bursting pressure for the treated samples was 225 p.s.i. while the median pressure for the untreated samples was only 187 p.s.i. The mean pressure for the treated samples was 233 p.s.i. and for the untreated 196 p.s.i. The 50% pass level for the treated samples was 220 p.s.i. and for the untreated samples 183 p.s.i.

Example II

The procedure of this example was the same as that of Example I except that powdered reagent grade ammonium chloride was dropped into each of 22 bottles instead of using trichloro-monofluoromethane. Approximately 0.04–0.07 gram of ammonium chloride was placed in each bottle. Twenty-four untreated bottles were also collected. Visual inspection of the samples after washing with water showed no significant difference in appearance between the treated and untreated samples.

The following table gives the results of the above tests showing the number of bottles which broke at particular bursting pressures:

| Bursting pressure (p.s.i.) | Control samples | | Treated samples | |
|---|---|---|---|---|
| | Number of samples broken | Accumulated percent breakage | Number of samples broken | Accumulated percent breakage |
| 137 | 4 | 17 | | |
| 150 | | | 2 | 9 |
| 162 | 1 | 21 | | |
| 175 | 2 | 29 | 1 | 14 |
| 187 | 3 | 42 | | |
| 200 | 1 | 46 | 5 | 36 |
| 225 | 5 | 67 | 2 | 45 |
| 250 | 4 | 83 | 7 | 77 |
| 275 | 1 | 87 | 4 | 95 |
| 300 | 1 | 92 | 1 | |
| 325 | 2 | | | |

The median bursting pressure for the treated samples was 250 p.s.i. and for the untreated samples 225 p.s.i. The mean pressure for the treated samples was 231 p.s.i. and for the untreated samples 216 p.s.i. The 50% pass level for the treated samples was 229 p.s.i. and for the untreated samples 205 p.s.i.

Example III

The procedure of this example was the same as that of Example I except that 144 soft drink bottles were treated with dichloro-tetrafluoroethane instead of treating beer bottles with trichloro-monofluoromethane as in Example I. An equal number of untreated samples were also collected. After washing with water, visual inspection showed no significant difference in appearance between the treated and untreated samples. Approximately 0.07 ounce (avoirdupois) of dichloro-tetrafluoroethane was injected into each bottle being tested.

The following table gives the results of the above tests showing the number of bottles which broke at particular bursting pressures:

| Bursting pressure (p.s.i.) | Control samples | | Treated samples | |
|---|---|---|---|---|
| | Number of samples broken | Accumulated percent breakage | Number of samples broken | Accumulated percent breakage |
| 187 | 2 | 1 | | |
| 200 | 3 | 4 | 2 | 1 |
| 225 | 4 | 6 | 1 | 2 |
| 250 | 10 | 13 | 6 | 6 |
| 275 | 19 | 26 | 9 | 13 |
| 300 | 16 | 38 | 14 | 22 |
| 325 | 14 | 47 | 11 | 30 |
| 350 | 14 | 57 | 13 | 39 |
| 375 | 20 | 71 | 15 | 49 |
| 400 | 12 | 79 | 15 | 60 |
| 425 | 14 | 89 | 21 | 74 |
| 450 | 7 | 94 | 16 | 85 |
| 475 | 4 | 97 | 12 | 94 |
| 500 | 3 | 98 | 5 | 97 |
| 525 | 1 | 99 | 1 | 98 |
| 550 | 1 | | 2 | 99 |
| 550 plus | | | 1 | |

The 50% pass level for the treated samples was 370 p.s.i. and for the control samples only 335 p.s.i.

The results set forth in Examples I, II, III show that glassware treated in accordance with the method of the present invention has substantially improved bursting strength as compared with glassware not so treated. In addition to the improvement in bursting strength, it was also found that the chemical durability or inertness of glassware is improved by the employment of the method of the present invention. The following Example IV shows the results of chemical durability tests of bottles formed in accordance with the procedure of Example III.

Example IV

Bottles were filled with distilled water that had a specific conductivity of between 0.9 and $1.5\times10^{-6}$ mhos at 25° C. The bottles were then capped with loosely fitted aluminum closures and placed in an autoclave. Saturated steam was admitted into the autoclave and allowed to vent for two minutes without raising the internal pressure of the autoclave. The vents were then closed off, and the internal pressure was raised while observing the following time-pressure-temperature schedule:

0–10 minutes, raise pressure to 2 p.s.i.
10–15 minutes, raise pressure to 5 p.s.i.
15–20 minutes, raise pressure to 8 p.s.i.
20–25 minutes, raise pressure to 11 p.s.i.
25–30 minutes, raise pressure to 15 p.s.i. (121° C.)
30–90 minutes, maintain pressure at 15 p.s.i.
90–120 minutes, reduce to atmospheric pressure.

The bottles were removed, and 100 ml. of extraction solution was measured out into graduated containers while still hot. This solution was then titrated with 0.02 N sulfuric acid solution to a methyl red-end point. The bottles were then refilled and retested by a repetition of the foregoing procedure for nine more complete test cycles.

The untreated bottles each required 1.5 milliliters of acid after each of the ten test cycles. In contrast, the treated bottles each required less than one drop (approximately 0.03 milliliter) of acid after each test cycle. These results show that the chemical durability of glassware treated in accordance with the method of the invention is greatly improved over that of untreated glassware.

In contrast to the improved strength and chemical durability of glassware treated in accordance with the method of the present invention as set forth in Examples I through IV, the test reported in Example V was conducted:

Example V

Twelve-ounce beer bottles of the nonreturnable type which had been formed on a Hartford-Empire I.S. machine and passed through an annealing lehr, were treated by injecting dichloro-difluoromethane into the bottles at room temperature. After treatment and washing, the samples were visually inspected, and no significant difference in appearance was observed between the treated samples and a number of control samples which had been formed and annealed in the same way but which had not been treated. Both the treated and the untreated bottles were then tested in accordance with the procedure set forth in Example I to determine their bursting pressure. The mean pressure for the untreated samples was 290 p.s.i. and for the treated samples only 239 p.s.i. The median bursting pressure for the untreated samples was 288 p.s.i. and for the treated samples only 225 p.s.i. From the above results, it is apparent that the method of the present invention provides a substantial improvement in the strength of glassware. Furthermore, the results show that employing the treating materials of the method of the invention in a post-annealing treatment does not provide the benefits and advantages achieved by the method of the present invention, and in fact results in a substantial reduction in strength.

The above description and examples show that the present invention provides a novel method of producing glassware having improved bursting strength and improved chemical durability. Furthermore, the invention provides a low cost, simple method for obtaining high strength, durable glassware by chemical treatment. Since changes in glass composition are not necessary to achieve strength and chemical durability improvement, the method of the invention provides a convenient means for producing improved glassware in short production runs. A further advantage of the method of the invention is that changes in the normal sequence of processing of glassware are not required. Moreover, the improved glassware produced in accordance with the method of the present invention is not significantly altered in its physical appearance.

[It will be apparent from the above description that various modifications in the method and articles described in detail may be made within the scope of the invention. For example, while the invention has been described particularly with reference to glass containers and other glassware, it is also applicable to the treatment of glass surfaces of other shapes and configurations. Therefore, the invention is not intended to be limited to the specific details described herein except as may be required by the following claims.]

What is claimed is:

1. A method for producing a glass article of improved chemical durability and bursting strength which comprises treating a newly formed glass article as delivered from a forming machine, with a decomposable halogen-containing compound while the article is at a temperature above the decomposition point of the halogen-containing compound due to the residual heat of formation retained by the article whereby the chemical durability and bursting strength of the article are improved while retaining substantially the original appearance of the article.

2. A method for producing a glass container of improved chemical durability and bursting strength which comprises treating a newly formed glass container as delivered from a forming machine, with a decomposable halogen-containing compound which decomposes at a temperature below about 800° F. while the container is at a temperature between about 800° F. and 1400° F. due to the residual heat of formation retained by the container and annealing the treated container whereby the chemical durability and bursting strength of the container are improved while retaining substantially the original appearance of the container.

3. A method for producing a glass container of improved chemical durability and bursting strength which comprises treating a newly formed glass container as delivered from a forming machine, with a decomposable polyhalogen-substituted organic compound while the container is at a temperature above the decomposition point of the compound due to the residual heat of formation retained by the container whereby the chemical durability and bursting strength of the container are improved while retaining substantially the original appearance of the container.

4. A method for producing a glass container of improved chemical durability and bursting strength which comprises treating the inner wall of a newly formed glass article as delivered from a forming machine, with a decomposable chloro-fluorohydrocarbon while the container is at a temperature above the decomposition point of the hydrocarbon due to the residual heat of formation retained by the container whereby the chemical durability and bursting strength of the container are improved while retaining substantially the original appearance of the container.

5. A method for producing a glass article of improved chemical durability and bursting strength which comprises treating a newly formed glass article as delivered from a forming machine, with a decomposable chloro-fluorohydrocarbon which decomposes at a temperature below about 800° F. while the article is at a temperature above about 800° F. due to the residual heat of formation retained by the article and annealing the treated article whereby the chemical durability and bursting strength of the article are improved while retaining substantially the original appearance of the article.

6. A method for producing a glass article of improved chemical durability and bursting strength which comprises treating a newly formed glass article as delivered from a forming machine, with a decomposable organic halide which decomposes at a temperature below about 800° F. while the article is at a temperature above about 800° F. due to the residual heat of formation retained by the article whereby the chemical durability and bursting strength of the article are improved while retaining substantially the original appearance of the article.

7. A method for producing a glass article of improved chemical durability and bursting strength which comprises treating a newly formed glass article as delivered from a forming machine, with a decomposable ammonium halide which decomposes at a temperature below about 800° F. while the article is at a temperature above about 800° F. due to the residual heat of formation retained by the article whereby the chemical durability and bursting strength of the article are improved while retaining substantially the original appearance of the article.

8. A method for producing a glass article of improved chemical durability and bursting strength which comprises treating a newly formed glass article as delivered from a forming machine, with ammonium chloride while the article is at a temperature above 800° F. due to the residual heat of formation retained by the article whereby the chemical durability and bursting strength of the article are improved while retaining substantially the original appearance of the article.

9. A method for producing a glass container of improved chemical durability and bursting strength which comprises introducing a decomposable chloro-fluorohydrocarbon into a newly formed glass container as delivered from a forming machine while the container is at a temperature between about 800° F. and 1400° F. due to the residual heat of formation and annealing the treated container, said hydrocarbon having a decomposition point below about 800° F., whereby the chemical durability and bursting strength of the container are improved while retaining substantially the original appearance of the container.

10. A glass article of improved chemical durability and bursting strength and substantially original appearance formed by treating a newly formed article with a decomposable halogen-containing compound while the article is at a temperature above the decomposition point of the compound due to the residual heat of formation retained by the article.

11. A glass container of improved chemical durability and bursting strength and substantially original appearance formed by treating a newly formed glass container with a decomposable halogen-containing compound while at a temperature between about 800° F. and 1400° F. due to the residual heat of formation, said halogen-containing compound having a decomposition point below about 800° F.

12. A glass container of improved chemical durability and bursting strength and substantially original appearance formed by treating a newly formed glass article with a decomposable polyhalogen-substituted organic compound while at a temperature between about 800° F. and 1400° F. due to the residual heat of formation, said polyhalogen-substituted organic compound having a decomposition point below about 800° F.

13. A glass container of improved chemical durability and bursting strength and substantially original appearance formed by treating the inner wall of a newly formed container with a decomposable chloro-fluorohydrocarbon while the container is at a temperature above the decomposition point of the compound due to the residual heat of formation retained by the container.

14. A glass article of improved chemical durability and bursting strength and substantially original appearance formed by treating a newly formed article with an organic halide while the article is at a temperature above the decomposition point of the halide due to the residual heat of formation retained by the article.

15. A glass article of improved chemical durability and bursting strength and substantially original appearance formed by treating a newly formed article with an ammonium halide while the article is at a temperature above the decomposition point of the halide due to the residual heat of formation retained by the article.

16. A glass article of improved chemical durability and bursting strength and substantially original appearance formed by treating a newly formed article with ammonium chloride while the article is at a temperature above the decomposition point of the chloride due to the residual heat of formation retained by the article.

17. A glass container of improved chemical durability and bursting strength and substantially original appearance formed by introducing a decomposable chloro-fluorohydrocarbon into newly formed container while the container is at a temperature between about 800° F. and 1400° F. due to the residual heat of formation and above the decomposition point of the hydrocarbon and annealing the treated container.

*18. The method of increasing the chemical durability of a glass bottle, said method comprising introducing trichloromonofluoromethane into the interior of the newly formed bottle, promptly after delivery from a forming machine, while the bottle is at a temperature in the range of about 800° F. to 1000° F., and in such amount that the ratio of volume of trichloromonofluoromethane to interior glass suface is substantially that when 0.1 milliliter of trichloromonofluoromethane is injected into a 12 ounce bottle.*

*19. The method of increasing the chemical durability of glass, said method comprising treating a heated, newly formed surface of the glass between a forming machine and an annealing lehr, with a fluorine-substituted hydrocarbon gas which is thermally decomposable at the temperature of the glass surface, and which, chemically treats the glass surface to increase the chemical durability thereof, and so correlating time, temperature and concentration of the treatment that the chemical durability of the surface is improved while retaining substantially its original appearance.*

*20. The method of increasing the chemical durability of glass claimed in claim 19 wherein the glass surface is at a temperature from about 800° F. to about 1400° F. at the time of treatment with the halogen compound.*

*21. The method of increasing the chemical durability of glass claimed in claim 20 wherein the glass surface treated is newly formed and is at a temperature from about 800° F. to about 1400° F. due to retained heat of formation.*

*22. The method of increasing the chemical durability of glass claimed in claim 20 wherein the fluorine-substituted hydrocarbon gas is a polyhalogen-substituted organic compound.*

*23. The method of increasing the chemical durability of glass, said method comprising treating a newly formed, heated surface of the glass, between a forming machine and an annealing lehr, with an inorganic halide salt which is thermally decomposable at the temperature of the glass surface, and which chemically treats the glass surface to increase the chemical durability therof, and so correlating time, temperature and concentration of the treatment that the chemical durability of the surface is improved while retaining substantially its original appearance.*

*24. The method of increasing the chemical durability of glass claimed in claim 23 wherein the inorganic halide salt is an inorganic fluoride salt.*

*25. The method of increasing the chemical durability of glass claimed in claim 22 wherein the fluorine-substituted hydrocarbon gas is also chlorine-substituted.*

*26. The method of increasing the chemical durability of glass claimed in claim 25 wherein the chlorofluorohydrocarbon is a dichlorotetrafluoroethane.*

References Cited

This following references, cited by the Examiner, are of record in the patented file of this patent or the original patent.

UNITED STATES PATENTS

| | | | |
|---|---|---|---|
| 1,760,427 | 5/1930 | Matlock | 65—30 X |
| 1,782,169 | 11/1930 | Kamita | 65—31 |
| 2,241,511 | 5/1941 | Greene | 65—31 |

| | | | |
|---|---|---|---|
| 2,525,725 | 10/1950 | Rodman | 65—31 |
| 2,881,566 | 4/1959 | Badger | 65—30 |
| 2,947,117 | 8/1960 | Greene et al. | 65—31 |
| 2,947,615 | 8/1960 | Greene et al. | 65—31 |
| 2,982,053 | 5/1961 | Elmer | 65—30 X |

S. LEON BASHORE, Primary Examiner

JOHN H. HARMAN, Assistant Examiner

U.S. Cl. X.R.

65—30, 31, 60; 117—129